July 7, 1970 — W. G. GRIMES — 3,519,769
LIQUID LEVEL SENSING ASSEMBLY WITH DUAL SPRING PROBES
Filed Jan. 14, 1969

INVENTOR.
WARREN G. GRIMES
BY John Cyril Malloy
ATTORNEY.

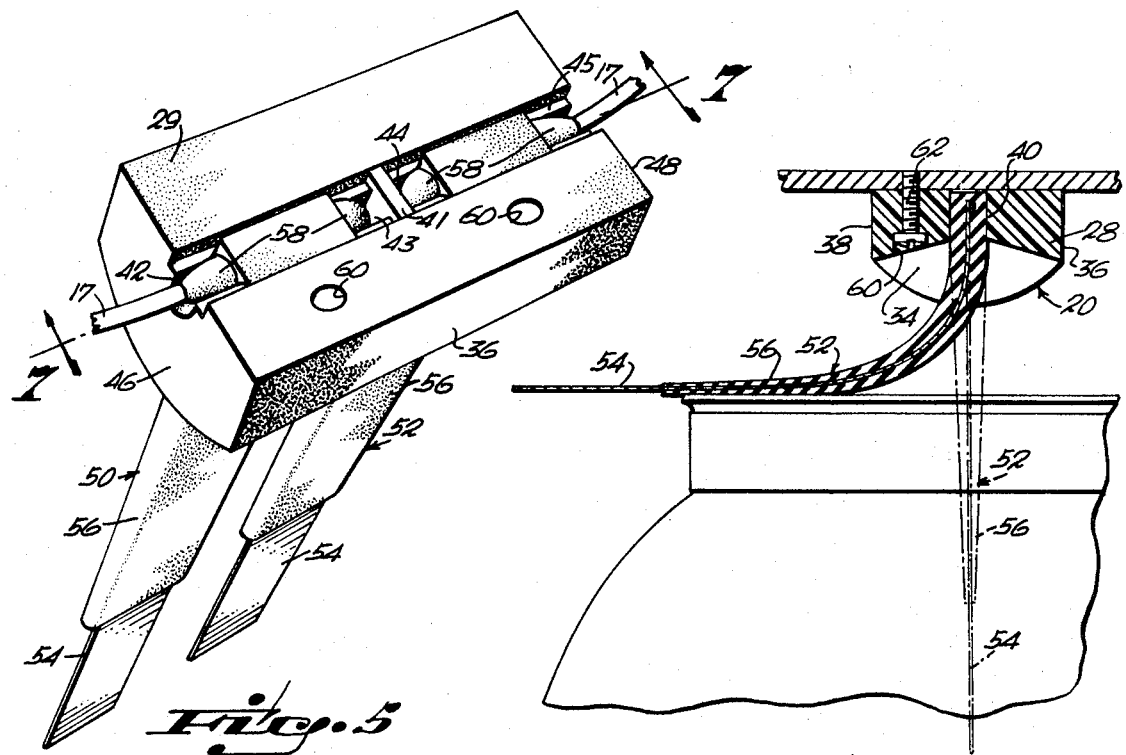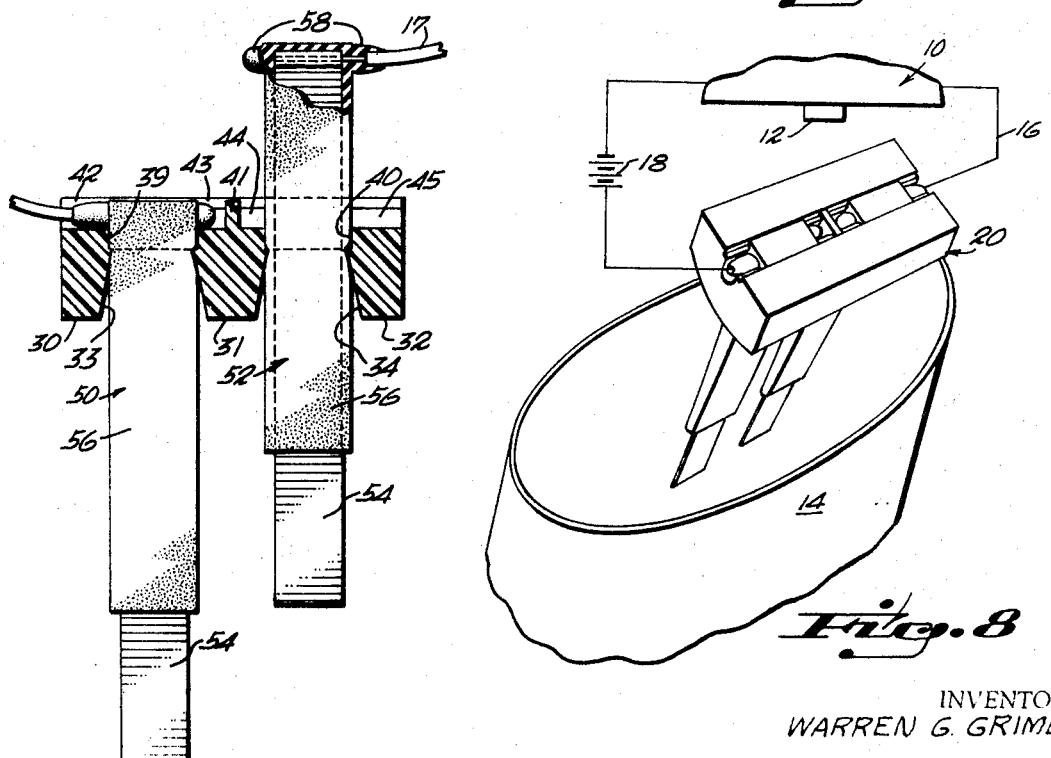

United States Patent Office 3,519,769
Patented July 7, 1970

3,519,769
LIQUID LEVEL SENSING ASSEMBLY WITH DUAL SPRING PROBES
Warren G. Grimes, Lake Drive Ext.,
Delray Beach, Fla. 33444
Filed Jan. 14, 1969, Ser. No. 791,100
Int. Cl. H01h 29/00
U.S. Cl. 200—61.05   9 Claims

ABSTRACT OF THE DISCLOSURE

A current-conducting, sensing assembly for sensing the liquid level in a receptacle receiving a potable mixture such as coffee produced in an automatic, aircraft galley, coffee-brewing machine, and in which the sensing assembly comprises a current-conducti ng pair of alloy probe elements which are relatively thin and flexible and which depend from a support block into the normal path of movement of the receptacle of the machine, to permit flexing or displacement of them out of the path, when the receptacle is removed or slid beneath the probe elements, and in which a substantial portion of each of the probe elements is encased in a plastic sleeve which tapers to merge and blend with the surface of the probe elements near, but not at, their respective distal ends to limit the minimum radius of curvature of the probes in flexing or displacement and to protect them from damage by sharp bends or kinking and rapid fatigue failure so that an electrical current flowing between the distal ends of the pair of probe elements will close a circuit.

---

This invention relates to an aircraft galley coffee-making machine with a liquid level sensing assembly with dual spring, current-conducting probes for sensing liquid levels in an aircraft galley coffee-brewing machine in which a relatively low amperage current is conducted through the liquid to close a circuit between the current-conducting probes when the liquid level in the coffee receptacle is at a predetermined level.

A coffee-making machine presently utilized, and particularly aboard aircraft, for example, is one in which a metal or plastic container having suitable ground coffee has opposed apertures through which hot water is circulated at a rate whereby a satisfactory and potable beverage is produced. It is preferable to afford passengers a freshly brewed beverage upon demand, and desirable not to prepare excessive quantities of a baverage because of waste and/or detrimental effects on the beverage taste.

Accordingly, it has been found that it is highly desirable to brew perhaps ten to fifteen cups of coffee at a time, permitting the stewardess to carry the pot to the passengers, while another pot is being filled with a fresh brew without stewardess supervision.

Level-sensing devices closing a circuit through immersion in the beverage must be capable of being maintained sanitary, non-corrosive, maintenance proof, reliable and stable.

Primary objects of the present invention are to provide a novel switch or sensing assembly for an electrical circuit, controlling production of brew in a coffee-making apparatus or the like; to provide a novel switch or sensing mechanism which is readily deformable for insertion in the throat of a receptical, but which is of a character to continuously reassume a predetermined form and configuration; to provide a relatively simple and readily repaired and maintained current-conducting switch or sensing assembly.

These, together with other and more specific objects and advantages, will become apparent from a consideration of the following description when taken in conjunction with the accompanying drawing forming a part thereof wherein:

FIG. 5 is a top perspective view of the sensing assembly;

FIG. 6 is a fragmentary sectional view taken substantially on the plane of line 6—6 of FIGURE 1, showing by phantom lines the attitude of the sensing elements of FIG. 1, and by solid lines how the elements are deformed by insertion of the receptacle beneath the sensing elements;

FIG. 7 is a sectional view taken substantially on the plane of line 7—7 of FIG. 5 with a portion broken away; and FIG. 8 is a substantially diagrammatic circuit in which the sensing or switch assembly is incorporated.

Figure 1:
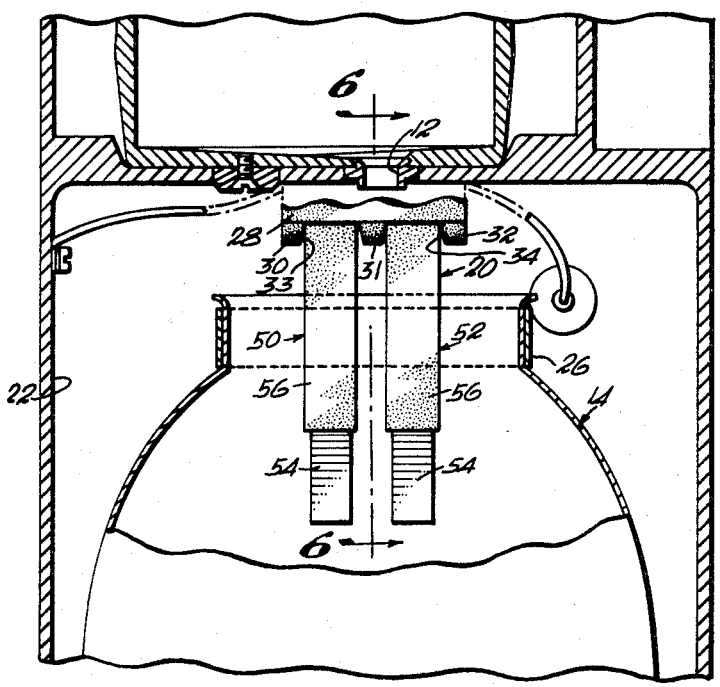
FIG. 1 is a fragmentary, elevational view, partly in section, showing the upper portion of a receptacle, a compartment in which it is received, the lower portion of a discharge nozzle, and the switch or sensing assembly of the invention.
Figure 2:
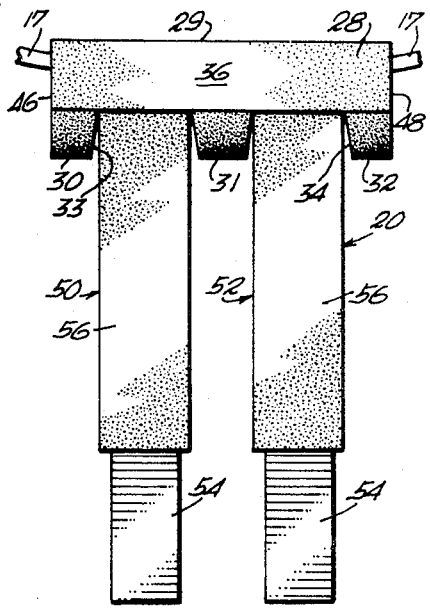
FIG. 2 is an enlarged, front elevational view of the sensing assembly per se.
Figure 4:
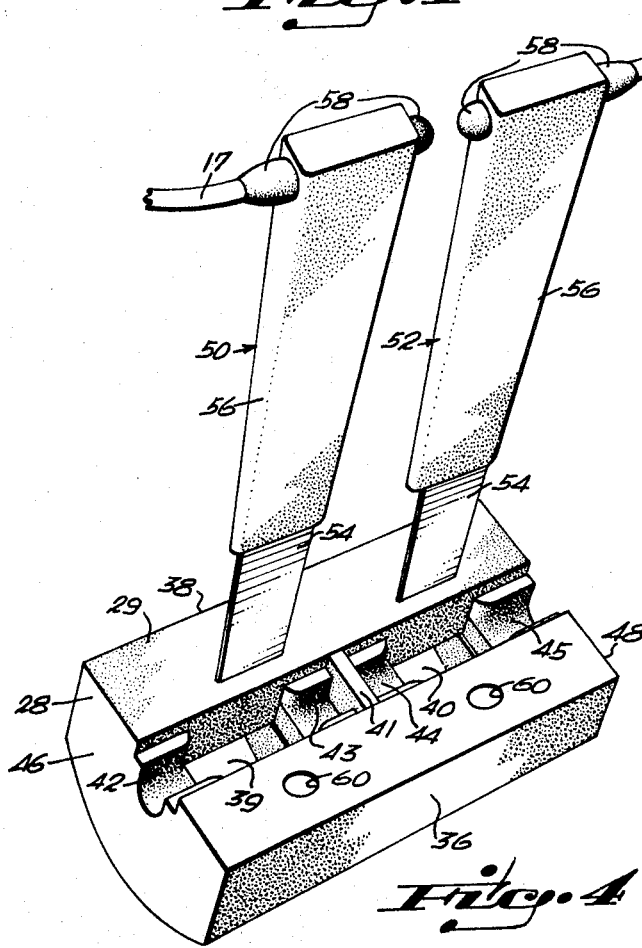
FIG. 4 is an exploded perspective view of the sensing or switching assembly.
Figure 3:
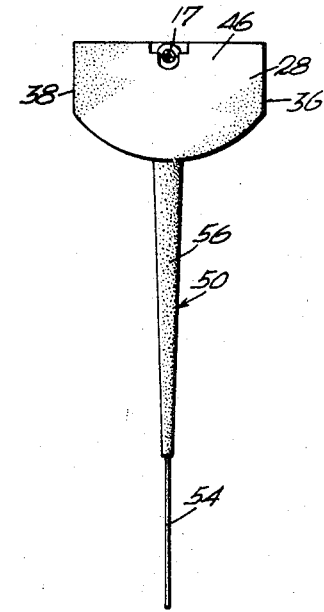
FIG. 3 is a side evelational view of FIG. 2.

Referring to the drawing in detail, and first considering FIG. 8, a coffee-making machine 10 includes a discharge nozzle 12 from which brewed coffee will be discharged into a receptacle 14. Operation of the coffee-making machine 10 is initiated by a suitable control switch (not shown) whereby heated water is circulated through a punctured can of ground coffee to continuously produce a highly satisfactory, fresh brew, This brewing system has been used in coin-operated machines and has proved satisfactory. The coffee-making machine switch or sensing device is operatively connected to a circuit 16 including a source of current 18, and when circuit 16 is closed, as will be described, the control switch for the machine is activated to terminate production of the coffee. On the other hand, the machine 10 can be permitted to operate substantially continuously whereby the receptacle 14 when removed from beneath nozzle 12 is immediately replaced by another. Connected in series in the circuit 16 is a switch or sensing assembly 20.

Referring to FIG. 1, for example, the discharge nozzle 12 of the machine 10 overlies a compartment 22 into which the switch 20 depends. The receptacle can comprise a metal or plastic pot with a conventional handle.

The assembly 20 comprises a support or block base 28 which is molded from a phenolic plastic or the like which is inert in coffee, hot water, etc., and which is substantially water-proof and a good electrical insulator. The block 28 has a flat top surface 29 and a series of depending, parallel ribs 30, 31 and 32 which define downwardly opening, isolated grooves 33 and 34 having upper inclined roofs opening toward side edges 36 and 38 of the block. Formed through the top surface 29 of block 28 are a pair of longitudinally disposed through slots 39 and 40 which extend the entire width of grooves 33 and 34, respectively, and which are insulated from each other by bridge or rib portions 41. Conveniently, the block 28 is undercut by longitudinal grooves 42, 43, and 44, 45 opening into the ends 46 and 48 of the block 28.

Interchangeable, deformable current-conducting fingers 50 and 52 are connected in circuit 16 and preferably comprise 0.002 stainless steel shim stock contact strips 54 about .318 inch wide and about 2½ inches long. The upper 2 inches of the contact 54 is encased in silicone rubber sheath 56 feathered into the surface of the contact strip 54 to which a conductor 17 is intimately bonded. The conductor 17 is encased at 58, which portion is received in grooves 42, 43 or 44, 45, as shown.

The contact strips 54 are identical in size, shape, etc., and have a dielectric constant. About 50 microamps is provided by the current source 18 (which is too low to cause an electrolytic action and deplating of the contact strips), and the coffee is an electrical conductor which will conduct the current between the pair of contact strips.

The switch or sensing assembly 20 has no movable electrical contacts. As the container 14 is moved beneath strip elements 54 they are flexed (see FIG. 6), and then depend into the receptacle whereafter operation of the coffee-making machine is initiated. When the coffee level rises to engage contact strips 54, the circuit (not shown) controlling operation of the machine 14 will be opened. Removal and insertion of a substitute receptacle 14 beneath spout 12 will result in refilling of a spare receptacle either automatically and/or by manual operation of suitable controls.

The strip contacts are a thin, spring tempered shim stock preferably of about 0.002 to 0.003 inch stainless steel which is "food grade," non-corrosive, non-magnetic, which are sheared so that polishing extends transversely, i.e., from opposite side edges, to promote ready flexure. Actually, an imperceptible radius is provided on the contact strip edges to prevent cutting and injury to the stewardesses, for example and also to provide fatigue resistance and to smooth and finish the edges to avoid stress riser edge cracks. This may be done by electropolishing techniques.

The sleeve or jacket 56 is a "food grade" silicone insulation which is heat resistant and non-toxic, generally described as "Silicone" rubber, which may be of the type commercially available and known under the trademark "Silastic." The conductors 17 are "Teflon" coated to resist high temperatures, and the "Silicone" rubber coat is intimately bonded to the conductor strips and feathered into the outer surface to prevent capillary "working" of coffee up the surface of the contact strips to the conductors.

The block 28 is conveniently apertured at 60 to receive fastener screws 62 therethrough.

The sheath 56 distributes flexure of the strips 54 and prevents fatigue rupture, and the grooves 33, 34 permit flexure with excessive bending in a concentrated area. The angular roofs in grooves 33 and 34 prevent excess bending of elements 54 adjacent the block grooves 33 and 34.

What is claimed is:

1. A liquid level sensing assembly for use in an electrical circuit to close the circuit in response to predetermined liquid levels in a container removably positioned within a receptacle having a path of entry and exit for the container comprising, a support block of an electrical insulating material,
   means on said block for mounting said block on a support member,
   said support block including, a pair of spaced electrically-insulated portions; and a pair of elongated current conductors respectively mounted in said insulated portions and depending therefrom for immersion in a body of water to conduct a micro-amperage current therebetween,
   each of said current conductors having a lead intimately bonded to the proximal portion;
   the current conductors being resilient, deformable, non-corrosible shim spring stock extending into the path and yieldable into and out of the path.

2. The structure as claimed in claim 1 in which said current conductors are transversely polished to facilitate transverse deformation, exposed edges of said shim stock being relieved.

3. The structure as claimed in claim 1 in which said support block includes a pair of lower downwardly-opening grooves communicating with slots opening into the upper surface of the block, the upper ends of said conductors being sealed and disposed in said slots below the upper surface of said block with the current conductors bonded thereto projecting laterally from opposite ends of said support block.

4. The structure as claimed in claim 1 in which the upper proximal portions of said conductors are sheathed in a resilient sheath extending to an intermediate portion of the conductors adjacent the lower terminal ends and exposing a relatively short section of said conductors, said sheath enclosing said bonded current conductors and merging into the surface of said conductors.

5. The structure as claimed in claim 4 in which said sheath comprises a silicone rubber.

6. The structure as claimed in claim 4 in which said condutcors are removably supported in said support block.

7. The structure as claimed in claim 4 in which said support block has slots and is undercut at the upper surface in communication with said slots and is complementary to the current conductors, and sheath-bonded thereto.

8. The structure as claimed in claim 4 in which said current conductors are transversely polished to facilitate transverse deformation, exposed edges of said shim stock being relieved.

9. The structure as claimed in claim 4 in which said support block includes a pair of lower downwardly-opening grooves communicating with slots opening into the upper surface of the block, the upper ends of said conductors being sealed and disposed in said slots below the upper surface of said block with the current conductors bonded thereto projecting laterally from opposite ends of said support block.

References Cited

UNITED STATES PATENTS

| | | | |
|---|---|---|---|
| 2,426,252 | 8/1947 | Thomson | 200—152.4 |
| 2,470,066 | 5/1949 | Calabrese | 200—152.4 XR |
| 3,407,262 | 10/1968 | Miller | 174—117.11 |

ROBERT K. SCHAEFER, Primary Examiner

M. GINSBURG, Assistant Examiner